US009379405B2

(12) United States Patent
Maekawa et al.

(10) Patent No.: US 9,379,405 B2
(45) Date of Patent: Jun. 28, 2016

(54) POLYMER ELECTROLYTE MEMBRANE HAVING ALKYLETHER GRAFT CHAIN

(71) Applicant: KANAGAWA UNIVERSITY, Yokohama (JP)

(72) Inventors: Yasunari Maekawa, Yokohama (JP); Kazuyuki Enomoto, Yokohama (JP); Nobuhiro Kihara, Yokohama (JP)

(73) Assignee: KANAGAWA UNIVERSITY, Yokohama (JP)

( * ) Notice: Subject to any disclaimer, the term of this patent is extended or adjusted under 35 U.S.C. 154(b) by 288 days.

(21) Appl. No.: 13/923,597

(22) Filed: Jun. 21, 2013

(65) Prior Publication Data
US 2013/0288159 A1    Oct. 31, 2013

Related U.S. Application Data

(62) Division of application No. 12/656,336, filed on Jan. 26, 2010, now Pat. No. 8,470,895.

(30) Foreign Application Priority Data

Feb. 3, 2009    (JP) .................................. 2009-022352

(51) Int. Cl.
*C08J 5/20*    (2006.01)
*H01M 8/10*    (2016.01)
*C08J 7/18*    (2006.01)

(52) U.S. Cl.
CPC ............... *H01M 8/1039* (2013.01); *C08J 7/18* (2013.01); *H01M 8/1018* (2013.01); *H01M 8/1023* (2013.01); *H01M 8/1088* (2013.01); *C08J 2323/00* (2013.01); *C08J 2327/12* (2013.01); *Y02E 60/521* (2013.01); *Y02P 70/56* (2015.11)

(58) Field of Classification Search
USPC .................................. 521/27; 429/29, 30, 33
See application file for complete search history.

(56) References Cited

U.S. PATENT DOCUMENTS

| 4,137,137 A * | 1/1979 | Machi ................. B01D 5/0012 521/27 |
| 6,242,123 B1 | 6/2001 | Nezu et al. |
| 6,670,065 B2 * | 12/2003 | Koyama ................ C08J 5/2256 429/481 |
| 6,828,386 B2 * | 12/2004 | MacKinnon ............ B01D 71/78 522/106 |
| 8,470,895 B2 * | 6/2013 | Maekawa ................... C08J 7/18 429/483 |
| 2006/0134493 A1 | 6/2006 | Yoshida et al. |
| 2008/0199756 A1 | 8/2008 | Takahashi et al. |
| 2009/0325027 A1 | 12/2009 | Maekawa et al. |
| 2010/0197815 A1 * | 8/2010 | Hoshikawa ............ C08G 61/10 521/25 |

FOREIGN PATENT DOCUMENTS

| JP | 11-111310 A | | 4/1999 |
| JP | 2001-348439 A | | 12/2001 |
| JP | 2004-010631 | * | 1/2004 |
| JP | 2004-87137 | | 3/2004 |
| JP | 2006-179301 A | | 7/2006 |
| JP | 2008-053041 A | | 3/2008 |
| JP | 2008-204857 A | | 9/2008 |

OTHER PUBLICATIONS

Restriction Requirement mailed from the Unites States Patent and Trademark Office on Mar. 22, 2012 in the related U.S. Appl. No. 12/656,336.
Office Action mailed from the Unites States Patent and Trademark Office on Aug. 6, 2012 in the related U.S. Appl. No. 12/656,336.
Notice of Allowance mailed from the Unites States Patent and Trademark Office on Feb. 28, 2013 in the related U.S. Appl. No. 12/656,336.
U.S. Appl. No. 12/656,336, filed Jan. 26, 2010, Yasunari Maekawa, et al., Japan Atomic Energy Agency and Kanagawa University.

* cited by examiner

*Primary Examiner* — Peter D Mulcahy
*Assistant Examiner* — Henry Hu

(57) ABSTRACT

An electrolyte membrane having alkylether graft chains for use in a fuel cell produced by a method of producing an electrolyte membrane for use in a fuel cell, including: performing radiation-induced graft polymerization of a vinyl monomer having nucleophilic functional groups, the vinyl monomer selected from an acylvinyl ether derivative, a styrene derivative, and a methacrylic acid derivative, with a polymer substrate comprising a polymer selected from a fluorine-containing polymer, an olefinic polymer, and an aromatic polymer; deprotecting the nucleophilic functional group, which is protected by an ester bond, of a graft chain on the polymer substrate introduced by the radiation-induced graft polymerization; and introducing an alkylethersulfonic acid structure into the deprotected nucleophilic functional group of the graft chain, by use of an electrophilic reagent selected from cyclic sulfonic acid ester and alkylhalide-sulfonate.

3 Claims, No Drawings

POLYMER ELECTROLYTE MEMBRANE HAVING ALKYLETHER GRAFT CHAIN

CROSS-REFERENCE TO RELATED APPLICATIONS

This application is a U.S. divisional application filed under 37 CFR 1.53(b) claiming priority benefit of U.S. Ser. No. 12/656,336 filed in the United States on Jan. 26, 2010, issued as U.S. Pat. No. 8,470,895 on Jun. 25, 2013, which application in turn is based upon and claims the benefit of foreign priority from Japanese Patent Application No. 2009-022352 filed on Feb. 3, 2009, the entire contents of which are incorporated by reference.

BACKGROUND

The present invention relates to an electrolyte membrane for use in fuel cells and a method of producing such an electrolyte membrane. In particular, the present invention relates to an electrolyte membrane suitable for use in solid polymer fuel cells that has excellent proton conductivity at low humidity, low water content, resistance to hot water, and fuel impermeability, and relates to a method of producing thereof.

As fuel cells using a polymer electrolyte membrane can be reduced in size and weight and have high power generation efficiency and energy density, fuel cells are expected to serve as a power supply for mobile devices using methanol, hydrogen, or the like as a fuel, a power supply for household cogeneration systems, and a power supply for fuel cell vehicles. In such fuel cells, a polymer electrolyte membrane, an electrode catalyst, a gas diffusion electrode, a membrane-electrode assembly, and the like are the major element technology. Development of a polymer electrolyte membrane having excellent properties for use in fuel cells is one of the most important component technologies.

In a solid polymer fuel cell, an electrolyte membrane acts as an "electrolyte" for conducting hydrogen ions (proton), and also acts as a "separator" for inhibiting hydrogen and methanol, both of which are fuels, from coming into direct contact with oxygen. Such a polymer electrolyte membrane is required to have a large ion exchange capacity. Chemical stability is also required to be tolerant of a long period of use; a polymer electrolyte membrane is especially required to exhibit a high proton conductivity and to be stable at a temperature of 80° C. or higher, which is an operating temperature of a cell, in any moisture state from a dry state to a flooding state. To serve as a separator, a polymer electrolyte membrane is required to have excellent mechanical strength, excellent dimensional stability, low hydrogen permeability, low methanol permeability, and low oxygen permeability.

Perfluorosulfonic acid membranes "Nafion (registered trademark of DuPont)" developed by DuPont and other membranes have been commonly employed as an electrolyte membrane for use in solid polymer fuel cells. Although the conventional fluorine-containing polymer electrolyte membranes such as Nafion® have excellent chemical durability and stability, they have a low ion-exchange capacity of about 1 mmol/g. Furthermore, when hydrogen is used as a fuel, cross-over of hydrogen and oxygen occurs. The membranes also have a disadvantage that mechanical properties of the membranes are significantly decreased at a temperature of above 100° C., which is a required operational condition of a power supply for use in vehicles. Further, as the production of a fluorine resin-containing polymer electrolyte membrane starts with the synthesis of a monomer, the number of production steps increases, causing the membrane to be expensive. This is a major obstacle to practical use as a power supply for household cogeneration systems or a power supply for fuel cell vehicles.

Thus, low-cost polymer electrolyte membranes to replace the fluorine-containing polymer electrolyte membranes have been actively developed. For example, in the development of a low-cost polymer electrolyte membrane, attempts have been made to produce an electrolyte membrane (fluorine-containing graft electrolyte membrane) for use in solid polymer fuel cells by graft polymerization of a fluorine-containing polymer membrane substrate, such as polytetrafluoroethylene, polyvinylidene fluoride, and an ethylene-tetrafluoroethylene copolymer, with a styrene monomer to introduce the monomer into the substrate, followed by sulfonation of the monomer (Patent Publications 1 and 2). However, since a fluorine-containing polymer membrane substrate has a low glass transition temperature, it has disadvantages that the mechanical strength of the membrane is significantly decreased at a high temperature of 100° C. or higher, and that it causes cross-over of hydrogen and oxygen used as fuels. Thus, attempts have been made to produce an electrolyte membrane (aromatic graft electrolyte membrane) by the graft polymerization and sulfonation using as a polymer substrate a wholly aromatic engineering plastic having excellent mechanical properties and fuel barrier properties at high temperatures (Patent Publication 3).

However, it is pointed out that during operation at a high temperature in the presence of water, polystyrene graft chains are decomposed to cause a deterioration involving a decrease in an ion exchange capacity of a membrane (Patent Publication 4). To inhibit the decomposition of graft chains observed in polystyrene sulfonic acid, attempts have been made to produce a polymer electrolyte membrane (alkyl type graft electrolyte membrane) comprising an alkyl sulfonic acid in the graft chains and having high ion conductivity, low fuel permeability, excellent resistance to hot water, and oxidation resistance by radiation-induced graft polymerization of monomers having an acrylic acid derivative or a vinyl ketone derivative as a skeleton, and then introduction of sulfonic acid groups into graft chains of the resulting polymer (Patent Publication 5).

Prior Art Includes:
  Patent Publication 1: JP2001-348439 A
  Patent Publication 2: JP2006-179301 A
  Patent Publication 3: JP2008-53041 A
  Patent Publication 4: JP11-111310 A
  Patent Publication 5: JP2008-204857 A In the foregoing aromatic graft electrolyte membrane, the sulfonation develops also in the aromatic polymer substrate membrane in the sulfonation reaction using chlorosulfonic acid. Thus, the membrane has inferior durability in long-term operation, such as proton conductivity, fuel impermeability, and oxidation resistance. Further, when a styrene derivative monomer having a sulfonic acid group or a precursor thereof that does not require the sulfonation reaction is used, the diffusion of the monomer is low and the radiation-induced graft polymerization is not sufficiently developed. Thus, there is a problem that the ion exchange capacity, i.e., proton conductivity, is low.

In the foregoing alkyl type graft electrolyte membrane, the sulfonic acid is directly introduced into a main chain of a graft chain. Due to steric hindrance, the introduction rate of the sulfonic acid groups is not higher than 30%. Thus, there is a problem that the ion exchange capacity, i.e., proton conductivity, is low. Furthermore, due to the presence of a carboxylic acid and an alkyl ketone structure in a graft chain, the membrane is inferior in durability in long-term operation, such as water content, fuel impermeability, and oxidation resistance.

Further, conventional graft electrolyte membranes have a problem that when the water content of a membrane is decreased in a low humidity state, the proton conductivity of the membrane is significantly decreased.

An object of the present invention is to provide a polymer electrolyte membrane that is suitable for use in fuel cells, and has high proton conductivity in any moisture state from a dry state to a flooding state, low water content, high mechanical properties at high temperatures, high durability in long-term operation such as resistance to hot water, and low fuel barrier properties, and to provide a method of producing such a polymer electrolyte membrane.

SUMMARY

The present invention provides a method of producing an electrolyte membrane for use in a fuel cell, comprising: performing radiation-induced graft polymerization of a vinyl monomer having a nucleophilic functional group selected from an acylvinyl ether derivative, a styrene derivative, and a methacrylic acid derivative, with a polymer substrate comprising a fluorine-containing polymer, an olefin-containing polymer, or an aromatic polymer; deprotecting an ester bond of a graft chain on the polymer substrate introduced by the radiation-induced graft polymerization; and introducing an alkylethersulfonic acid structure into the nucleophilic functional group of the graft chain thus deprotected, by use of an electrophilic reagent selected from cyclic sulfonic acid ester and alkylhalide-sulfonate.

Examples of preferred fluorine-containing polymers that can be used in the present invention as a polymer substrate include polytetrafluoroethylene (hereinafter PTFE), a tetrafluoroethylene-hexafluoropropylene copolymer (hereinafter FEP), a tetrafluoroethylene-perfluoroalkylvinyl ether copolymer (hereinafter PFA), polyvinylidene fluoride (hereinafter PVDF), an ethylene-tetrafluoroethylene copolymer (hereinafter ETFE), polyvinyl fluoride (hereinafter PVF), and a polychlorotrifluoroethylene copolymer (hereinafter ECTFE). Crosslinking of a fluorine-containing polymer in advance can further improve the heat resistance of a membrane and inhibit swelling of the membrane.

Examples of olefin-containing polymers that can be used in the present invention as a polymer substrate include: low-density, high-density, or ultrahigh molecular weight polyethylene; low-density, high-density, or ultrahigh molecular weight polypropylene; and polymers having trimethylpentene as a polymerization unit. Crosslinking of an olefin-containing polymer in advance can further improve the heat resistance of a membrane and inhibit swelling of the membrane.

Preferred aromatic polymers that can be used as a polymer substrate in the present invention are aromatic hydrocarbon-containing polymers called a high-performance resin (super engineering plastic). Specific examples include polyimide, polyamideimide, polyetherimide, polyethylene naphthalate, liquid crystalline aromatic polymers, polyetheretherketone, polyphenylene oxide, polyphenylene sulfide, polysulfone, and polyether sulfone.

To improve the durability or inhibit swelling of an electrolyte membrane, a composite material of a thermoplastic resin and various inorganic fillers, or a polymer alloy can be used as a polymer substrate.

In the present invention, vinyl monomers having nucleophilic functional groups are introduced into a polymer substrate by radiation-induced graft polymerization. A vinyl monomer for use in the present invention is selected from acylvinyl ether derivatives, styrene derivatives, and methacrylic acid derivatives.

Examples of preferred acylvinyl ether derivatives include vinyl acetate, vinyl propionate, vinyl butyrate, and vinyl benzoate.

Examples of preferred styrene derivatives include 2-hydroxystyrene, 3-hydroxystyrene, 4-hydroxystyrene, 4-(methylhydroxystyrene), 4-(1-ethylhydroxystyrene), 4-(1-hydroxy-1-methylethylstyrene), 4-acetoxystyrene, 4-t-butyloxycarboxystyrene, and 4-acetoxymethylstyrene.

Preferred methacrylic acid derivatives are compounds in which a hydroxyl group or a precursor thereof is bonded to methacrylic acid. Specific examples include 1-hydroxymethylacrylic acid, 1-(1-hydroxyethyl)acrylic acid, methyl 1-hydroxymethylacrylate, methyl 1-(1-hydroxyethyl)acrylate, ethyl 1-hydroxymethylacrylate, ethyl 1-(1-hydroxyethyl)acrylate, 1-acetoxymethylacrylic acid, 1-(acetoxyethyl)acrylic acid, methyl 1-acetoxymethylacrylate, and methyl 1-(acetoxyethyl)acrylate.

These vinyl monomers may be used alone or in combination, or may be diluted with a solvent and then used. One or multiple hydrocarbon-containing vinyl monomers and/or fluorocarbon-containing vinyl monomers may be added to the foregoing vinyl monomers and then polymerized by radiation-induced graft polymerization. Since addition of 50% by weight (wt %) or more of a hydrocarbon-containing vinyl monomer and/or a fluorocarbon-containing vinyl monomer leads to a decrease in an amount of contained sulfonic acid groups and a decrease in an electrical conductivity, a preferred amount to be added is less than 50% by weight.

Examples of preferred hydrocarbon-containing vinyl monomers include isobutene, butadiene, and acetylene derivatives.

Examples of preferred hydrogen fluoride-containing vinyl monomers include heptafluoropropyltrifluorovinyl ether, ethyltrifluorovinyl ether, hexafluoropropene, perfluoro(propylvinyl ether), pentafluoroethyltrifluorovinyl ether, perfluoro(4-methyl-3,6-dioxanon-1-ene), trifluoromethyltrifluorovinyl ether, and hexafluoro-1,3-butadiene.

In the present invention, a crosslinking agent such as a polyfunctional monomer may be used in combination with a vinyl monomer to crosslink graft chains in a step of radiation-induced graft polymerization. Crosslinking may be formed between graft chains, between aromatic polymer chains, or between a graft chain and an aromatic polymer chain by addition of a polyfunctional monomer or application of radiation after the graft polymerization is completed. Examples of polyfunctional monomers that can be used as a crosslinking agent include bis(vinylphenyl)ethane, divinylbenzene, 2,4,6-triallyloxy-1,3,5-triazine(triallylcyanurate), triallyl-1,2,4-benzenetricarboxylate(triallyltrimelitate), diallyl ether, bis(vinylphenyl)methane, divinyl ether, 1,5-hexadiene, and butadiene. It is preferable to use a crosslinking agent at a weight ratio of 20% or below with respect to the vinyl monomer. Use of 20% or more of a crosslinking agent produces a brittle polymer electrolyte membrane. As a result of the crosslinking, the water content of an electrolyte membrane decreases, and chemical bonds are increased. Thus, the mechanical strength of the electrolyte membrane is increased. Consequently, deformation of an electrolyte membrane due to swelling resulting from absorption of water can be moderated, and deterioration of an electric membrane during operation of a fuel cell can be inhibited.

In the present invention, the radiation-induced graft polymerization is carried out preferably by application of radiation of 5 kGy to 1000 kGy to a polymer substrate at a room temperature to 150° C. in the presence of an inert gas or oxygen. With radiation of 5 kGy or lower, it is difficult to obtain a grafting degree necessary to obtain an electrical conductivity of at least 0.02 ($[\Omega \cdot cm]^{-1}$) that a fuel cells is required to have. On the other hand, application of radiation of 1000 kGy or higher produces a brittle polymer membrane substrate. The graft polymerization can be carried out by either simultaneous irradiation in which a polymer substrate and a vinyl monomer derivative are simultaneously irradiated to effect grafting reaction, or preirradiation in which a polymer substrate is irradiated first and then brought into contact with a vinyl monomer derivative to effect grafting reaction. However, since a smaller amount of homopolymers is produced in the preirradiation method, the preirradiation method is preferred. The preirradiation method includes a polymer radical method in which radiation is applied to a polymer substrate in an inert gas, and a peroxide method in which radiation is applied to a polymer substrate in the presence of oxygen. Either of the methods can be used.

The radiation-induced graft polymerization of a polymer substrate is carried out by soaking the polymer substrate into a vinyl monomer derivative liquid. In view of graft polymerizability of a polymer substrate and maintenance of the shape of a membrane in a polymerization solution of a graft polymer substrate obtained by graft polymerization, it is preferable to use a method in which a polymer substrate is soaked in a vinyl monomer derivative solution diluted with a solvent such as dichloroethane, chloroform, N-methylformamide, N-methylacetamide, N-methylpyrrolidone, gamma-butyrolactone, n-hexane, methanol, ethanol, 1-propanol, t-butanol, toluene, cyclohexane, cyclohexanone, and dimethyl sulfoxide.

In the present invention, the grafting degree is 4% by weight to 100% by weight, preferably 70% by weight to 100% by weight, with respect to a polymer substrate. With a grafting degree of 4% by weight or below, it is difficult to obtain an electrical conductivity of at least 0.02 ($[\Omega \cdot cm]^{-1}$) that a fuel cells is required to have.

In the present invention, nucleophilic functional groups of graft chains introduced in a polymer substrate by the radiation-induced graft polymerization are protected by ester bonds. Thus, hydrolytic deprotection is carried out under alkaline or acidic conditions so that the membrane expresses nucleophilicity. In the present invention, it is preferable to deprotect nucleophilic functional groups such that 80% to 100% of the nucleophilic functional groups are deprotected.

Then, an alkylethersulfonic acid structure is introduced into the deprotected nucleophilic functional groups using an electrophilic reagent selected from cyclic sulfonic acid ester and alkylhalide-sulfonate.

Examples of preferred cyclic sulfonic acid ester that can be used in the present invention include 1,3-propanesultone, 1,4-butanesultone, 1,1,2,2-tetrafluoroethylsultone, and 1,1,2,2,3,3-hexafluoropropanesultone.

Examples of preferred alkylhalide-sulfonate that can be used in the present invention include sodium 2-bromoethylsulfonate and sodium 3-bromopropylsulfonate.

In view of swelling properties of a polymer substrate, solubility of a sulfonation agent, and reactivity, it is preferable to use an organic solvent at a time of introduction of an alkylethersulfonic acid structure. Examples of preferred organic solvents that can be used include toluene, xylene, tetrahydrofuran, N,N-dimethylformamide, N-methylpyrrolidone, 1,2-dichloroethane, 1,1,2,2-tetrachloroethane, chloroform, and methylene chloride.

A polymer electrolyte membrane with a higher electrical conductivity, which has a positive correlation with an ion exchange capacity, shows a higher level of performance as a polymer electrolyte membrane. The term "ion exchange capacity" as used herein refers to an amount of ion exchange groups per 1 gram of a dry electrolyte membrane (mmol/g). However, when the electrical conductivity of an ion exchange membrane is not greater than 0.02($[\Omega \cdot cm]^{-1}$) at 25° C., in many cases the output performance as a fuel cell is significantly decreased. Thus, a polymer electrolyte membrane is required to have an electrical conductivity of at least 0.02 ($[\Omega \cdot cm]^{-1}$), and a higher-performance polymer electrolyte membrane is required to have an electrical conductivity of at least 0.10 ($[\Omega \cdot cm]^{-1}$). In the present invention, the grafting degree and the sulfonation degree are controlled in the steps of radiation-induced graft polymerization and introduction of the alkylethersulfonic acid structure to control an ion exchange capacity, i.e., electrical conductivity, of an electrolyte membrane. An electrolyte membrane produced by a method of the present invention has a grafting degree of 70% by weight to 100% by weight, a sulfonation degree of 10 meq/g to 45 meq/g, and an electrical conductivity of greater than 0.02 ($[\Omega \cdot cm]^{-1}$).

A possible way of increasing the electrical conductivity of an electrolyte membrane is to reduce the thickness of the electrolyte membrane. However, an excessively thin electrolyte membrane is easily broken under the existing conditions. Thus, an electrolyte membrane with a thickness in the range of 30 μm to 200 μm is commonly used. Electrolyte membranes of the present invention for use in fuel cells that have a thickness in the range of 5 μm to 200 μm, preferably 10 μm to 100 μm, are useful.

The present invention makes it possible to produce an electrolyte membrane that has excellent proton conductivity at low humidity, oxidation resistance, resistance to hot water, and fuel impermeability and is suitable for use in solid polymer fuel cells by selective reaction of a nucleophilic functional group of a vinyl monomer introduced in a polymer substrate by radiation-induced graft polymerization with an electrophilic reagent selected from cyclic sulfonic acid ester and alkylhalide-sulfonate, followed by introduction of an alkylethersulfonic acid structure with high phase separation properties and high stability in an environment of high temperature and low humidity.

EMBODIMENTS

The present invention is described in further detail in the following non-limiting Examples. The measured values were obtained as follows.

(1) Grafting Degree (%)

A weight ratio of a graft chain portion, which is a portion that was graft polymerized with a vinyl monomer, to a main chain portion, which is a polymer substrate, is expressed by the following grafting degree ($X_{dg}$ [%]).

$$X_{dg}=100(W_2-W_1)/W_1 \qquad \text{[Formula 1]}$$

$W_1$: weight in a dry state before grafting (g)
$W_2$: weight in a dry state after grafting (g)

(2) Ion Exchange Capacity (mmol/g)

An ion exchange capacity (IEC) of a polymer electrolyte membrane is expressed by the following formula.

$$IEC=[n(\text{acidic group})_{obs}]/W_3 \text{ (mM/g)} \qquad \text{[Formula 2]}$$

[n(acidic group)$_{obs}$]: amount of acidic groups in a polymer electrolyte membrane (mM)
$W_3$: weight of a dry polymer electrolyte membrane (g)

The measurement of [n(acidic group)$_{obs}$] was carried out as follows. A polymer electrolyte membrane was soaked in a 1M hydrochloric acid solution at room temperature for 12 hours to completely convert into a proton type (H type) and then was soaked in an aqueous solution of 3M NaCl at room temperature for 12 hours to convert into a —SO$_3$Na type, again. After the polymer electrolyte membrane was removed, the residual NaCl aqueous solution was subjected to neutralization titration with 0.1M NaOH to obtain concentration of substituted protons (H+) and thus concentration of acidic groups in the polymer electrolyte membrane.

(3) Sulfonation Degree (%)

A sulfonation degree of a polymer electrolyte membrane is expressed by the following formula.

$$\text{Sulfonation degree} = 100 \times [n(\text{acidic group})_{obs}]/(W_2/M_g) \text{ (mol/mol)} \quad \text{[Formula 3]}$$

[n(acidic group)$_{obs}$]: amount of acidic groups in a polymer electrolyte membrane (mol)

$M_g$: molecular weight of graft monomer (g/mol)

(4) Water Content (%)

After an H type polymer electrolyte membrane that was stored in water at room temperature was removed and water on the surface of the membrane was lightly wiped (after about 1 minute), the weight was measured ($W_4$ (g)). This membrane was vacuum dried at 40° C. for 16 hours and then measured to obtain a dry weight $W_3$ (g) of the polymer electrolyte membrane, and the water content was calculated from $W_4$ and $W_3$ using the following formula.

$$\text{Water content} = 100(W_4 - W_3)/W_3 \quad \text{[Formula 4]}$$

(5) Electrical Conductivity (S/cm)

Measurement by alternating current method: A membrane resistance measurement cell having platinum electrodes and an LCR meter E-4925A of Hewlett-Packard were used. A polymer electrolyte membrane that was in a saturated swelling state in water at room temperature was removed and then sandwiched between the platinum electrodes, and the membrane resistance (Rm) was measured using impedance. The electrical conductivity of a polymer electrolyte membrane was calculated using the following formula.

$$\kappa = 1/Rm \cdot d/S \quad \text{[Formula 5]}$$

κ: electrical conductivity of polymer electrolyte membrane (S/cm)

d: thickness of polymer electrolyte membrane (cm)

S: current-carrying area of polymer electrolyte membrane (cm$^2$)

(5) Resistance to Hot Water (Percentage of Residual Weight)

$W_5$ denotes a weight of a polymer electrolyte membrane that was vacuum-dried at 60° C. for 16 hours, and $W_6$ denotes a dry weight of an electrolyte membrane soaked in water at 100° C. for 500 hours.

$$\text{Resistance to hot water} = 100(W_6/W_5)(\%) \quad \text{[Formula 6]}$$

Example 1

An ETFE membrane (Asahi Glass Co., Ltd., Aflex) having a thickness of 50 μm and a size of 3 cm×2 cm was charged into a glass ampoule having a stopcock. The glass ampoule was purged with argon gas of 1 atmosphere. In this state, 20 kGy of gamma rays (dose rate 20 kGy/h) was irradiated on the glass ampoule at room temperature. After irradiated, the glass ampoule was vacuum degassed, and 30 ml of a vinyl acetate monomer solution (100%) which had been purged with argon and the membrane was immersed in the vinyl acetate monomer solution. After the glass ampoule was purged with argon, the stopcock was closed to seal the glass ampoule, and the reaction was carried out in a constant-temperature water tank at 40° C. for 1 hour. After the reaction was completed, the membrane was immersed three times in toluene at 60° C. to remove unreacted monomers and homopolymers. Then, the membrane was dried to obtain a grafted membrane with a grafting degree of 70-100%. This grafted membrane was immersed in a solution of sodium hydroxide in methanol (equivalent weight that was 1.2 times the acetic ester contained in the grafted membrane) at 50° C. for 2 hours to deprotect 100% of hydroxyl groups. The deprotected grafted membrane was put into a reaction solution that was prepared by dilution of 2.5 mmol (0.22 mL) of 1,3-propanesultone and 2.5 mmol (0.35 mL) of triethylamine with 30 mL of toluene, and refluxed for 4 hours to effect sulfonation. Then, the membrane was immersed in 1M hydrochloric acid at 60° C. for 12 hours and thereafter sufficiently washed with water to produce an electrolyte membrane. The grafting degree, the sulfonation degree, the ion exchange capacity, the water content, the electrical conductivity, and the resistance to hot water of the electrolyte membrane were measured. The results are shown in Table 1.

Example 2

The procedure of Example 1 was repeated, except that the reflux time in the sulfonation was 6 hours, to produce an electrolyte membrane. The grafting degree, the sulfonation degree, the ion exchange capacity, the water content, the electrical conductivity, and the resistance to hot water of the electrolyte membrane were measured. The results are shown in Table 1.

Example 3

The procedure of Example 1 was repeated to produce a grafted membrane in which hydroxyl groups were deprotected. This deprotected grafted membrane was put into a reaction solution that was prepared by dilution of 2.5 mmol (0.16 mL) of 1,1,2,2-tetrafluoroethylsultone and 2.5 mmol (0.35 mL) of triethylamine with 30 mL of toluene, and was refluxed for 10 hours to effect sulfonation. Then, the membrane was immersed in 1M hydrochloric acid at 60° C. for 12 hours and then sufficiently washed with water to produce an electrolyte membrane. The grafting degree, the sulfonation degree, the ion exchange capacity, the water content, the electrical conductivity, and the resistance to hot water of the electrolyte membrane were measured. The results are shown in Table 1.

Example 4

An ETFE membrane having a thickness of 50 μm and a size of 3 cm×2 cm was charged into a glass ampoule having a stopcock. The glass ampoule was purged with argon gas of 1 atmosphere. In this state, 20 kGy of gamma rays (dose rate 20 kGy/h) was irradiated on the glass ampoule at room temperature. After irradiated, the glass ampoule was vacuum degassed, and 30 ml of a dioxane solution of a 4-acetoxystyrene monomer (50 vol %) which had been purged with argon gas was charged into the glass ampoule to immerse the membrane. After the glass ampoule was purged with argon, the stopcock was closed to seal the glass ampoule, and the reaction was carried out in a constant-temperature water tank at 60° C. for 8 hours. After the reaction was completed, the membrane was immersed three times in toluene at 60° C. to remove unreacted monomers and homopolymers. Then, the membrane was dried to obtain a grafted membrane with a grafting degree of 93%. This grafted membrane was immersed in a solution of sodium hydroxide in methanol (equivalent weight that was 1.2 times the acetic ester contained in the grafted membrane) at 50° C. for 2 hours to deprotect 100% of hydroxyl groups. This deprotected grafted membrane was put into a reaction solution that was prepared by dilution of 2.5 mmol (0.22 mL) of 1,3-propanesultone and 2.5 mmol (0.35 mL) of triethylamine with 30 mL of toluene, and refluxed for 4 hours to effect sulfonation. Then, the membrane was immersed in 1M hydrochloric acid at 60° C. for 12 hours and thereafter sufficiently washed with water to produce an electrolyte membrane. The grafting degree, the sulfonation degree, the ion exchange capacity, the water content, the electrical conductivity, and the resistance to hot water of the electrolyte membrane were measured. The results are shown in Table 1.

Example 5

An ETFE membrane having a thickness of 50 μm and a size of 3 cm×2 cm was charged into a glass ampoule having a stopcock. The glass ampoule was purged with argon gas of 1 atmosphere. In this state, 20 kGy of gamma rays (dose rate 20 kGy/h) was irradiated on the glass ampoule at room temperature. After irradiated, the glass ampoule was vacuum degassed, and 30 ml of a dioxane solution of methyl 1-hydroxymethylacrylate monomer (50 vol %) which had been purged with argon gas was charged into the glass ampoule to immerse the membrane. After the glass ampoule was purged with argon, the stopcock was closed to seal the glass ampoule, and the reaction was carried out in a constant-temperature water tank at 60° C. for 24 hours. After the reaction was completed, the membrane was immersed three times in toluene at 60° C. to remove unreacted monomers and homopolymers. Then, the membrane was dried to obtain a grafted membrane with a grafting degree of 94%. This grafted membrane was immersed in a mixed solution of an aqueous solution of 5M sodium hydroxide and methanol (volume ratio 1:1) at 50° C. for 2 hours to deprotect 100% of methyl ester. This deprotected grafted membrane was put into a reaction solution that was prepared by dilution of 2.5 mmol (0.22 mL) of 1,3-propanesultone and 2.5 mmol (0.35 mL) of triethylamine with 30 mL of toluene, and refluxed for 4 hours to effect sulfonation. Then, the membrane was immersed in 1M hydrochloric acid at 60° C. for 24 hours and thereafter sufficiently washed with water to produce an electrolyte membrane. The grafting degree, the sulfonation degree, the ion exchange capacity, the water content, the electrical conductivity, and the resistance to hot water of the electrolyte membrane were measured. The results are shown in Table 1.

Example 6

A polyetherether ketone (PEEK) membrane (manufactured by Victrex, amorphous PEEK) having a thickness of 50 μm and a size of 3 cm×2 cm was charged into a glass ampoule having a stopcock. The glass ampoule was purged with argon gas of 1 atmosphere. In this state, 200 kGy of gamma rays (dose rate 20 kGy/h) was irradiated on the glass ampoule at room temperature. After irradiated, the glass ampoule was vacuum degassed, and 30 ml of a dioxane solution of methyl 1-hydroxymethylacrylate monomer (50 vol %) which had been purged with argon gas was charged into the glass ampoule to immerse the membrane. After the glass ampoule was purged with argon, the stopcock was closed to seal the glass ampoule, and the reaction was carried out in a constant-temperature water tank at 60° C. for 24 hours. After the reaction was completed, the membrane was immersed three times in toluene at 60° C. to remove unreacted monomers and homopolymers, and thereafter dried to obtain a grafted membrane with a grafting degree of 94%. This grafted membrane was immersed in a mixed solution of an aqueous solution of 5M sodium hydroxide and methanol (volume ratio 1:1) at 50° C. for 2 hours to quantitatively deprotect the methyl ester. This deprotected grafted membrane was put into a reaction solution that was prepared by dilution of 2.5 mmol (0.22 mL) of 1,3-propanesultone and 2.5 mmol (0.35 mL) of triethylamine with 30 mL of toluene, and refluxed for 4 hours to effect sulfonation. Then, the membrane was immersed in 1M hydrochloric acid at 60° C. for 24 hours and thereafter sufficiently washed with water to produce an electrolyte membrane. The grafting degree, the sulfonation degree, the ion exchange capacity, the water content, the electrical conductivity, and the resistance to hot water of the electrolyte membrane were measured. The results are shown in Table 1.

Example 7

A polyetherether ketone (PEEK) membrane having a thickness of 50 μm and a size of 3 cm×2 cm was charged into a glass ampoule having a stopcock. The glass ampoule was purged with argon gas of 1 atmosphere. In this state, 200 kGy of gamma rays (dose rate 20 kGy/h) was irradiated on the glass ampoule at room temperature. After irradiated, the glass ampoule was vacuum degassed, and 30 ml of a vinyl acetate monomer solution (100%) which had been purged with argon gas was charged into the glass ampoule to immerse the membrane. After the glass ampoule was purged with argon, the stopcock was closed to seal the glass ampoule, and the reaction was carried out in a constant-temperature water tank at 40° C. for 10 hours. After the reaction was completed, the membrane was immersed three times at 60° C. to remove unreacted monomers and homopolymers. Then, the membrane was dried to obtain a grafted membrane with a grafting degree of 70-90%. The deprotection of hydroxyl groups in the resulting grafted membrane and the sulfonation were carried out by the same methods as those in Example 1 to produce an electrolyte membrane. The grafting degree, the sulfonation degree, the ion exchange capacity, the water content, the electrical conductivity, and the resistance to hot water of the electrolyte membrane were measured. The results are shown in Table 1.

Comparative Example 1

An ETFE membrane having a thickness of 50 μm and a size of 3 cm×2 cm was charged into a glass ampoule having a stopcock. The glass ampoule was purged with argon gas of 1 atmosphere. In this state, 15 kGy of gamma rays (dose rate 20 kGy/h) was irradiated on the glass ampoule at room temperature. After irradiated, the glass ampoule was vacuum degassed, and 20 ml of a toluene solution of a styrene monomer (50 vol %) which had been purged with argon gas was charged into the glass ampoule to immerse the membrane. After the glass ampoule was purged with argon, the stopcock was closed to seal the glass ampoule, and the reaction was carried out in a constant-temperature water tank at 60° C. for 8 hours. After the reaction was completed, the membrane was immersed three times in toluene at 60° C. to remove unreacted monomers and homopolymers. Then, the membrane was dried to obtain a grafted membrane with a grafting degree of 55%. This membrane obtained by the graft polymerization was put into a solution of 0.2M chlorosulfonic acid diluted with 1,2-dichloroethane, and reaction was carried out at 50° C. for 6 hours to effect sulfonation. Then, the membrane was sufficiently washed with water. The grafting degree, the sulfonation degree, the ion exchange capacity, the water content, the electrical conductivity, and the resistance to hot water of the electrolyte membrane were measured. The results are shown in Table 1.

Comparative Example 2

A polyetherether ketone (PEEK) membrane having a thickness of 50 μm and a size of 3 cm×2 cm was charged into a glass ampoule having a stopcock. The glass ampoule was purged with argon gas of 1 atmosphere. In this state, 200 kGy of gamma rays (dose rate 20 kGy/h) was irradiated on the glass ampoule at room temperature. After irradiated, gas in the glass ampoule was vacuum degassed, and 30 ml of a dioxane solution of styrenesulfonic acid and ethyl ester (50 vol %) which had been purged with argon gas was charged into the glass ampoule to immerse the membrane. After the glass ampoule was purged with argon, the stopcock was closed to seal the glass ampoule, and the reaction was carried out in a constant-temperature water tank at 80° C. for 24 hours. After the reaction was completed, the membrane was immersed three times in toluene at 60° C. to remove unreacted monomers and homopolymers. Then, the membrane was dried to obtain a grafted membrane with a grafting degree of 75%. This grafted membrane was left in water at 95° C. for 10 hours to hydrolyze the sulfonic acid ester. The grafting degree, the sulfonation degree, the ion exchange capacity, the water content, the electrical conductivity, and the resistance to hot water of the electrolyte membrane were measured. The results are shown in Table 1.

TABLE 1

Properties of electrolyte membranes

| | Grafting degree (%) | Sulfonation degree (%) | Ion exchange capacity (meq/g) | Water content (%) | Electrical conductivity (S/cm) | Resistance to hot water (%) |
|---|---|---|---|---|---|---|
| Example 1 | 81 | 28 | 1.4 | 36 | 0.035 | 90 |
| Example 2 | 81 | 39 | 1.6 | 56 | 0.095 | 86 |
| Example 3 | 85 | 33 | 1.4 | 31 | 0.10 | 95 |
| Example 4 | 93 | 42 | 1.3 | 33 | 0.85 | 93 |
| Example 5 | 94 | 16 | 0.66 | 44 | 0.95 | 98 |
| Example 6 | 75 | 38 | 1.5 | 42 | 0.10 | 98 |
| Example 7 | 83 | 34 | 1.5 | 28 | 0.12 | 99 |
| Comp. Example 1 | 55 | 97 | 1.6 | 55 | 0.096 | 65 |
| Comp. Example 2 | 75 | 33 | 1.4 | 66 | 0.10 | 80 |

The results shown in Table 1 teach that the electrolyte membranes of Examples 1-6 of the present invention having an alkylethersulfonic acid structure in which a derivative monomer was graft polymerized had the same ion exchange capacity and the same electrical conductivity as those of the conventional electrolyte membranes of Comparative Examples 1 and 2 in which the polystyrene sulfonic acid monomers was graft polymerized with ETFE or PEEK by the radiation-induced graft polymerization, but had a lower water content and an improved resistance to hot water than those of the conventional electrolyte membranes of Comparative Examples 1 and 2; thus, the electrolyte membranes of Examples 1-6 of the present invention are effective as an electrolyte membrane for use in fuel cells. Further, the electrolyte membranes of Examples 3 and 6 in which perfluoroalkyl groups were introduced and the electrolyte membranes of Examples 5 and 6 comprising an aromatic hydrocarbon substrate membrane had better electrical conductive properties and resistance to hot water than those of the electrolyte membrane of Example 1 comprising the fluorine-containing substrate membrane and the hydrocarbon sulfonic acid graft chain. The results shown in Table 1 demonstrate the high effectiveness of the present invention.

What is claimed is:

1. An electrolyte membrane comprising alkylether graft chains for use in a fuel cell produced by the method of producing an electrolyte membrane for use in a fuel cell, comprising:
performing radiation-induced graft polymerization of a vinyl monomer having nucleophilic functional groups, wherein the vinyl monomer is selected from an acylvinyl ether derivative, a styrene derivative selected from the group consisting of 4-acetoxystyrene, 4-t-butyloxycarboxystyrene, and 4-acetoxymethylstyrene, and a methacrylic acid derivative, with a polymer substrate selected from a fluorine-containing polymer, an olefinic polymer, and an aromatic polymer;
deprotecting the nucleophilic functional group, which is protected by an ester bond of a graft chain on the polymer substrate introduced by the radiation-induced graft polymerization; and
introducing an alkylethersulfonic acid structure into the deprotected nucleophilic functional group of the graft chain, by use of an electrophilic reagent selected from cyclic sulfonic acid ester and alkylhalide-sulfonate,
wherein the electrolyte membrane has a resistance to hot water of 85% to 100% the resistance to hot water defined by:

resistance to hot water=$100(W_6/W_5)(\%)$ wherein $W_5$ denotes a weight of a polymer electrolyte membrane that was vacuum-dried at 60° C. for 16 hours, and $W_6$ denotes a dry weight of an electrolyte membrane soaked in water at 100° C. for 500 hours.

2. The electrolyte membrane comprising alkylether graft chains for use in a fuel cell of claim 1, wherein:
the acylvinyl ether derivative is selected from the group consisting of vinyl acetate, vinyl propionate, vinyl butyrate, and vinyl benzoate;
the methacrylic acid derivative is selected from the group consisting of 1-hydroxymethylacrylic acid, 1-(1-hydroxyethyl)acrylic acid, methyl 1-hydroxymethylacrylate, methyl 1-(1-hydroxyethyl)acrylate, ethyl 1-hydroxymethylacrylate, ethyl 1-(1-hydroxyethyl)acrylate, 1-acetoxymethylacrylic acid, 1-(acetoxyethyl)acrylic acid, methyl 1-acetoxymethylacrylate, and methyl 1-(acetoxyethyl)acrylate.

3. The electrolyte membrane comprising alkylether graft chains for use in a fuel cell of claim 1, wherein:
the cyclic sulfonic acid ester is selected from the group consisting of 1,3-propanesultone, 1,4-butanesultone, 1,1,2,2-tetrafluoroethylsultone, and 1,1,2,2,3,3-hexafluoropropanesultone; and
the alkyl halide sulfonic acid is selected from the group consisting of sodium 2-bromoethylsulfonate and sodium 3-bromopropylsulfonate.

* * * * *